US009752519B2

(12) United States Patent
Vassallo et al.

(10) Patent No.: US 9,752,519 B2
(45) Date of Patent: Sep. 5, 2017

(54) METHOD OF CONTROLLING AN EXHAUST RECIRCULATION GAS SYSTEM

(71) Applicant: GM GLOBAL TECHNOLOGY OPERATIONS LLC, Detroit, MI (US)

(72) Inventors: Alberto Vassallo, Turin (IT); Stefano Pellegrino, Trofarello (IT); Salvatore Sannino, Grugliasco (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 184 days.

(21) Appl. No.: 14/516,410

(22) Filed: Oct. 16, 2014

(65) Prior Publication Data
US 2015/0101583 A1 Apr. 16, 2015

(30) Foreign Application Priority Data
Oct. 16, 2013 (GB) .................................. 1318366.0

(51) Int. Cl.
| F02D 41/00 | (2006.01) |
| F02M 26/14 | (2016.01) |
| F02M 26/05 | (2016.01) |
| F02M 26/06 | (2016.01) |
| F02M 26/02 | (2016.01) |
| F02D 41/14 | (2006.01) |

(52) U.S. Cl.
CPC ....... *F02D 41/005* (2013.01); *F02D 41/0007* (2013.01); *F02D 41/0065* (2013.01); *F02M 26/02* (2016.02); *F02M 26/05* (2016.02); *F02M 26/06* (2016.02); *F02M 26/14* (2016.02); *F02D 41/1445* (2013.01); *F02D 41/1446* (2013.01); *F02D 2200/0406* (2013.01); *F02D 2200/0414* (2013.01); *F02D 2200/0418* (2013.01); *Y02T 10/144* (2013.01); *Y02T 10/47* (2013.01)

(58) Field of Classification Search
CPC .................................................... F02D 41/1446
USPC ......................................................... 123/676
See application file for complete search history.

(56) References Cited

U.S. PATENT DOCUMENTS

| 6,312,154 B1 * | 11/2001 | Schick ................. G01N 33/225 374/36 |
| 2004/0123588 A1 * | 7/2004 | Stanglmaier ........ F02D 13/0249 60/295 |
| 2009/0107140 A1 * | 4/2009 | Pursifull ............... B60W 10/10 60/600 |
| 2011/0010079 A1 | 1/2011 | Shutty et al. |
| 2011/0131957 A1 | 6/2011 | Hepburn et al. |

(Continued)

FOREIGN PATENT DOCUMENTS

| WO | 2006043892 A1 | 4/2006 |
| WO | 2007076038 A2 | 7/2007 |

(Continued)

*Primary Examiner* — Jacob Amick
*Assistant Examiner* — Charles Brauch
(74) *Attorney, Agent, or Firm* — Lorenz & Kopf LLP

(57) ABSTRACT

A method of controlling an exhaust gas recirculation system of an internal combustion engine is disclosed. The engine includes a compressor, an intake manifold, an after-treatment system, a low pressure EGR system and a high pressure EGR system. The method temporarily adjusts a low pressure EGR ratio, keeping constant a total EGR rate, after verifying at least one among compressor parameters, after-treatment system parameters or intake manifold parameter.

13 Claims, 6 Drawing Sheets

(56) References Cited

U.S. PATENT DOCUMENTS

2011/0180030 A1* 7/2011 Martin .................... F02P 23/04
123/143 B
2012/0095664 A1* 4/2012 Nakamura .......... F02D 41/0052
701/102

FOREIGN PATENT DOCUMENTS

WO 2008118660 A1 10/2008
WO 2013164548 A2 11/2013

* cited by examiner

METHOD OF CONTROLLING AN EXHAUST RECIRCULATION GAS SYSTEM

CROSS REFERENCE TO RELATED APPLICATION

This application claims priority to British Patent Application No. 1318366.0 filed Oct. 16, 2013, which is incorporated herein by reference in its entirety.

TECHNICAL FIELD

The technical field relates to a method of controlling an exhaust recirculation gas system of an internal combustion engine. More particularly, for diesel engines provided with both a low pressure and a high pressure exhaust gas recirculation system, the method is suitable for optimizing the rate split between such systems.

BACKGROUND

An internal combustion engine, particularly a highly efficient diesel engine is normally provided with an exhaust gas after-treatment system, for degrading and/or removing the pollutants from the exhaust gas emitted by the diesel engine, before discharging it in the environment.

The after-treatment system generally includes an exhaust line for leading the exhaust gas from the diesel engine to the environment, a Diesel Oxidation Catalyst (DOC) located in the exhaust line, for oxidizing hydrocarbon (HC) and carbon monoxides (CO) into carbon dioxide ($CO_2$) and water ($H_2O$), a Lean $NO_x$ Trap (LNT), for trapping nitrogen oxides NOx contained in the exhaust gas and is located in the exhaust line and a diesel Particulate Filter (DPF) located in the exhaust line downstream the DOC, for removing diesel particulate matter or soot from the exhaust gas.

To further reduce the emissions content, in particular NOx emissions, normally diesel engines include an exhaust gas recirculation (EGR) system coupled between the exhaust manifold and the intake manifold. This embodiment is also called as high pressure exhaust gas recirculation (HP-EGR). As known, the EGR works by recirculating a portion of an exhaust gas from the engine back to the engine cylinders. In a diesel engine, the exhaust gas replaces some of the excess oxygen in the pre-combustion mixture. Because NOx forms primarily when a mixture of nitrogen and oxygen is subjected to high temperature, the lower combustion chamber temperatures caused by EGR reduces the amount of NOx the combustion generates. More recent embodiments also include a low pressure EGR system (LP-EGR) characterized by a "long route" of the exhaust gases. In this case the additional EGR valve will recirculate the exhaust gases downstream of the after-treatment devices towards the compressor inlet. The operating principle of the LP-EGR is the same of the HP-EGR, with the further advantage that the LP-EGR recirculates exhaust gases at still lower temperature. Of course, an important control parameter of such system is the split of the recirculated exhaust gas mass (the EGR rate) between the HP-EGR route and the LP-EGR route.

Although the combination of HP-EGR and LP-EGR, together with the mentioned after-treatment systems, seems very promising for controlling exhaust emissions, it is necessary to increase the functionalities of the low-pressure EGR systems in view of the application of new homologation cycles. Such cycles, as the new Worldwide Light duty Test Procedure (WLTP) and the Real-life Drive Emissions (RDE), are highly transient cycles. In this way, systems that have been designed to operate under the current New European Driving Cycle (NEDC) certification should increase their operating range without hardware upgrade, with a favorable cost benefit. In fact, the homologation cycles WLTP and RDE will increase quite extensively the operating range under which the emission control must be accomplished. For both HP-EGR and LP-EGR systems this may pose a significant design challenge, as operating limits may be exceeded under certain operating conditions, for different reasons. For example, in some engine operating points, the allowable outlet compressor temperature value may be exceeded, while in some other engine operating points the allowable outlet temperature value of the HP-EGR cooler may be overcome as well. In addition, optimal after-treatment operating parameters may be exceeded, due to an excessive space velocity or a high exhaust gas temperature. In particular, exhaust gas temperature and space velocity at the LNT inlet may exceed their optimal values. Finally, the compressor pressure ratio may overcome surge limitations, under fast acceleration transients.

Therefore a need exists for an improved method of controlling an exhaust recirculation gas system of an internal combustion engine, provided with both a low pressure and a high pressure exhaust gas recirculation system.

SUMMARY

The present disclosure provides a method of controlling an exhaust recirculation gas system by optimizing the rate split between a low pressure and a high pressure exhaust gas recirculation system. The present disclose also contemplates the method achieved by an apparatus, by an engine, by an automotive system, by a computer program and computer program product.

An embodiment of the disclosure provides a method of controlling an exhaust gas recirculation system of an internal combustion engine, the engine at least including a compressor, an intake manifold, an after-treatment system, a low pressure EGR system and a high pressure EGR system, wherein the method temporarily adjusts a low pressure EGR ratio, keeping constant a total EGR rate, after verifying at least one among compressor parameters, after-treatment system parameters or intake manifold parameter and wherein the low pressure EGR ratio and the total EGR rate are defined by the following equations:

$$LP - EGR \text{ ratio} = \frac{LP - EGR \text{ rate}}{(LP - EGR \text{ rate} + HP - EGR \text{ rate})}$$

$$\text{total } EGR \text{ rate} = LP - EGR \text{ rate} + HP - EGR \text{ rate}$$

Consequently, an apparatus is disclosed for performing the above method, the apparatus including means for temporarily adjusting a low pressure EGR ratio, keeping constant a total EGR rate, and means for verifying at least one of compressor parameters, after-treatment system parameters or intake manifold parameter.

An advantage of this embodiment is that it enhances the management of the split of the EGR rate between low pressure EGR and high pressure EGR, thanks to the relatively stable emission levels which can be obtained if the split is varied within a certain range, This means that an additional parameter, the rate split itself, is available for optimizing other engine operating parameters. This is particularly useful for extending the LP-EGR system potentialities in view of the new homologation cycles.

According to a preferred embodiment, the compressor parameters are a compressor pressure ratio, a compressor inlet humidity and a compressor outlet temperature. Consequently the means for verifying at least one among compressor parameters, after-treatment system parameters or intake manifold parameter are operating when the compressor parameters are a compressor pressure ratio, a compressor inlet humidity and a compressor outlet temperature.

According to another preferred embodiment, the after-treatment system parameters are an exhaust gas temperature and an exhaust gas space velocity. Consequently the means for verifying at least one among compressor parameters, after-treatment system parameters or intake manifold parameter are operating when the after-treatment system parameters are an exhaust gas temperature and an exhaust gas space velocity.

According to a further preferred embodiment, the intake manifold parameter is an intake manifold temperature. Consequently the means for verifying at least one among compressor parameters, after-treatment system parameters or intake manifold parameter are operating when the intake manifold parameter is an intake manifold temperature.

An advantage of these embodiments is that the method can check all relevant parameters to decide how to fine tune the low pressure EGR ratio. For example, in some engine operating points, the allowable outlet compressor temperature and/or compressor inlet humidity values may be exceeded. In addition, optimal after-treatment operating parameters may be exceeded, due to an excessive space velocity or exhaust gas temperature. Finally, the compressor pressure ratio may overcome surge limitations, under fast acceleration transients.

According to another embodiment, the low pressure EGR ratio is increased if the compressor pressure ratio is higher than a maximum compressor pressure ratio and the compressor inlet humidity is lower than a maximum compressor inlet humidity and the compressor outlet temperature is lower than a maximum compressor outlet temperature and the low pressure EGR ratio is lower than a maximum low pressure EGR ratio. Consequently, the means for temporarily adjusting a low pressure EGR ratio are configured to increase the low pressure EGR ratio if the compressor pressure ratio is higher than a maximum compressor pressure ratio and the compressor inlet humidity is lower than a maximum compressor inlet humidity and the compressor outlet temperature is lower than a maximum compressor outlet temperature and the low pressure EGR ratio is lower than a maximum low pressure EGR ratio.

An advantage of this embodiment is that the surge risk (which is monitored by keeping the compressor pressure ratio lower than an allowable compressor pressure ratio) is decreased because of the correspondent flow increase through the compressor, due to the increased low pressure EGR rate, which as the effect to quickly shift the compressor operating point far from the surge line.

According to a still further embodiment the low pressure EGR ratio is decreased if the exhaust gas space velocity is higher than an optimal exhaust gas space velocity and the intake manifold temperature is lower than the maximum intake manifold temperature and the compressor pressure ratio is lower than the maximum compressor pressure ratio value and the low pressure EGR ratio is higher than a minimum low pressure EGR ratio. Consequently, the means for temporarily adjusting a low pressure EGR ratio are configured to decrease the low pressure EGR ratio if the exhaust gas space velocity is higher than an optimal exhaust gas space velocity and the intake manifold temperature is lower than the maximum intake manifold temperature and the compressor pressure ratio is lower than the maximum compressor pressure ratio value and the low pressure EGR ratio is higher than a minimum low pressure EGR ratio.

An advantage of this embodiment is that the space velocity over the after-treatment system is optimized by reducing the exhaust flow rate thanks to a corresponding reduction of the low pressure EGR ratio.

According to still another embodiment, the low pressure EGR ratio LP-EGR ratio is increased if the exhaust gas temperature is higher than a maximum exhaust gas temperature and the compressor inlet relative humidity is lower than the maximum compressor inlet relative humidity and the compressor outlet temperature is lower than the maximum compressor outlet temperature and the low pressure EGR ratio is lower than the maximum low pressure EGR ratio. Consequently the means for temporarily adjusting a low pressure EGR ratio are configured to increase the low pressure EGR ratio if the exhaust gas temperature is higher than a maximum exhaust gas temperature and the compressor inlet relative humidity is lower than the maximum compressor inlet relative humidity and the compressor outlet temperature is lower than the maximum compressor outlet temperature and the low pressure EGR ratio is lower than the maximum low pressure EGR ratio.

An advantage of this embodiment is that the exhaust temperature level for NOx storage is kept under the allowable threshold even during heavy operations thanks to the reduction of the low pressure EGR rate.

Another embodiment of the disclosure provides an internal combustion engine at least including a compressor, an intake manifold, an after-treatment system, a low pressure EGR system and a high pressure EGR system. The control of the low pressure EGR system and high pressure EGR system is performed by using a method according to any of the previous embodiments.

The method according to one of its aspects can be carried out with the help of a computer program including a program-code for carrying out all the steps of the method described above, and in the form of computer program product including the computer program. The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
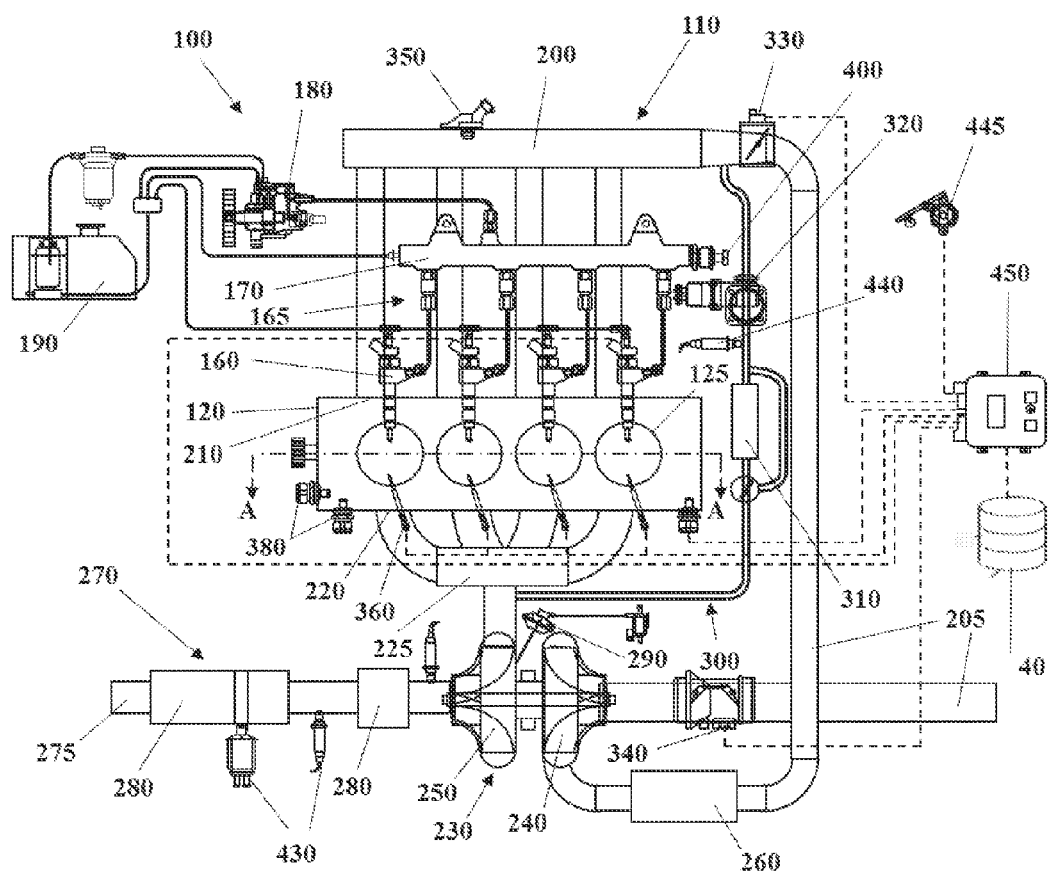
FIG. 1 shows an automotive system.
Figure 2:
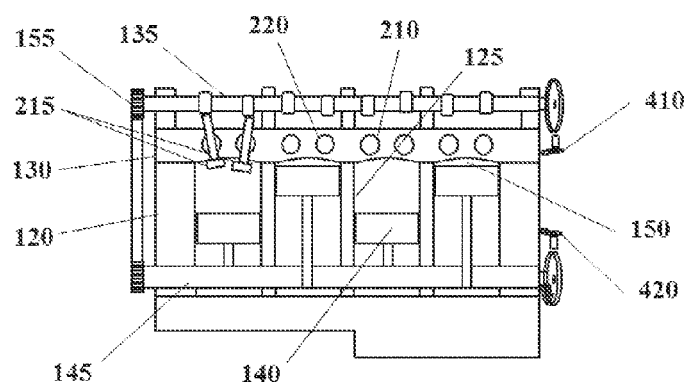
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. The fuel injection system with the above disclosed components is known as Common Rail diesel Injection System (CR System).

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems, and particulate filters.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Figure 3:
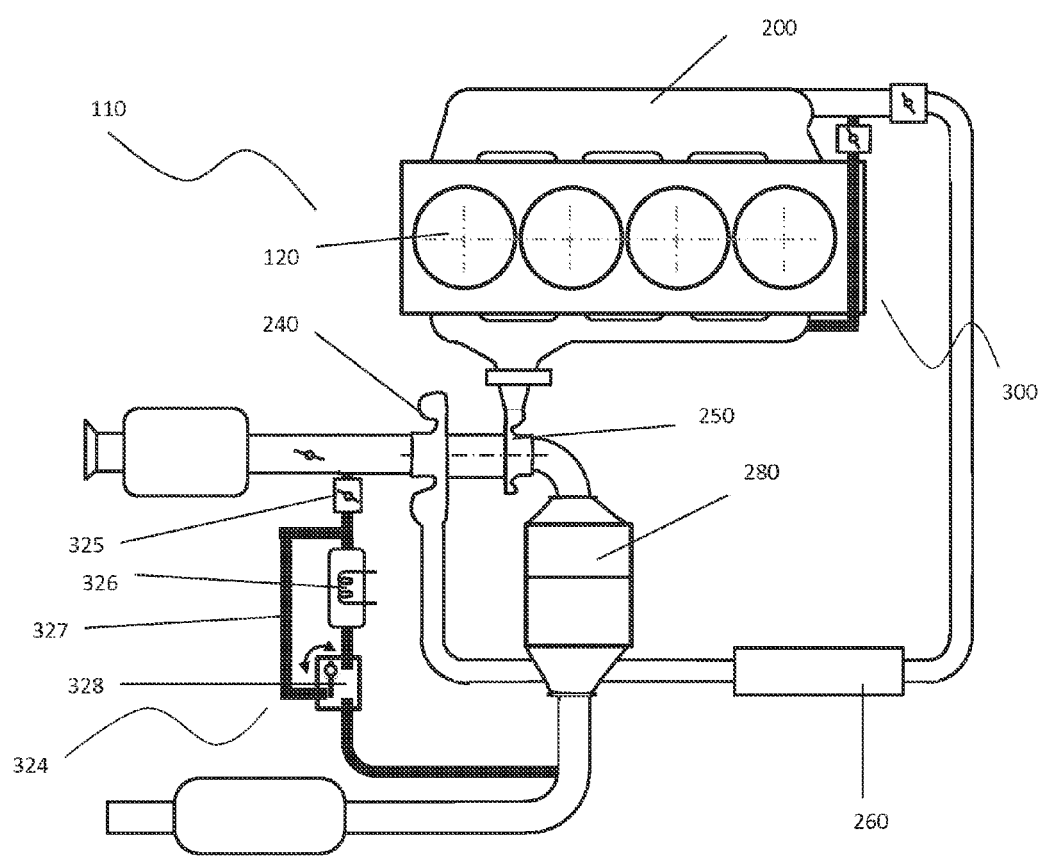
FIG. 3 is a scheme of the internal combustion engine also including a low pressure EGR system.

Still other embodiments as shown in FIG. 3 may include a low pressure EGR system (LP-EGR) characterized by a "long route" of the exhaust gases. In this case an additional low pressure EGR valve 325 will recirculate the exhaust gases downstream the after-treatment devices towards the compressor 240 inlet. Moreover, a low pressure EGR-cooler 326 can be provided, together with a cooler by-pass circuit 327 and a control valve 328. The total EGR rate will be the sum of the low pressure EGR rate and the high pressure EGR rate. The split or, in other words, the low pressure EGR ratio (LP-EGR ratio) can be defined as follows:

$$LP-EGR \text{ ratio} = \frac{LP-EGR \text{ rate}}{(LP-EGR \text{ rate} + HP-EGR \text{ rate})}$$

Where:

LP-EGR rate: gas flow rate through the low pressure EGR system

HP-EGR rate: gas flow rate through the high pressure EGR system

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor, which can be a digital pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

The proposed technique involves the adoption of varying the rate split between low pressure and high pressure EGR systems, under highly transient conditions, in order to avoid drawbacks such as compressor surge, compressor over-temperature or in order to improve the operation of after-treatment by optimizing the space velocity and temperature of the exhaust gases, not only during the warm-up, but also under the aggressive high-speed driving style typical of RDE and WLTP homologation cycles.

In fact, several experimental activities have demonstrated that there is a certain authority in modifying the ratio between low pressure EGR rate and high pressure EGR rate, which does not affect emissions in an appreciable way. This modification provides an additional calibration degree of freedom, which could be used to optimize certain operating parameters.

In order to accomplish this, HP-EGR and LP-EGR split is instantaneously adjusted, based on verification of certain criteria on the compressor pressure ratio, compressor outlet temperature, as well as the exhaust gas temperature and space velocity across the after-treatment system. If any of these parameters are over their allowable values and the conditions to change the split between LP-EGR rate and HP-EGR rate are verified (in other words the change of the split does not deteriorate the emission levels), then the low pressure EGR ratio can be tuned accordingly.

Figure 4:
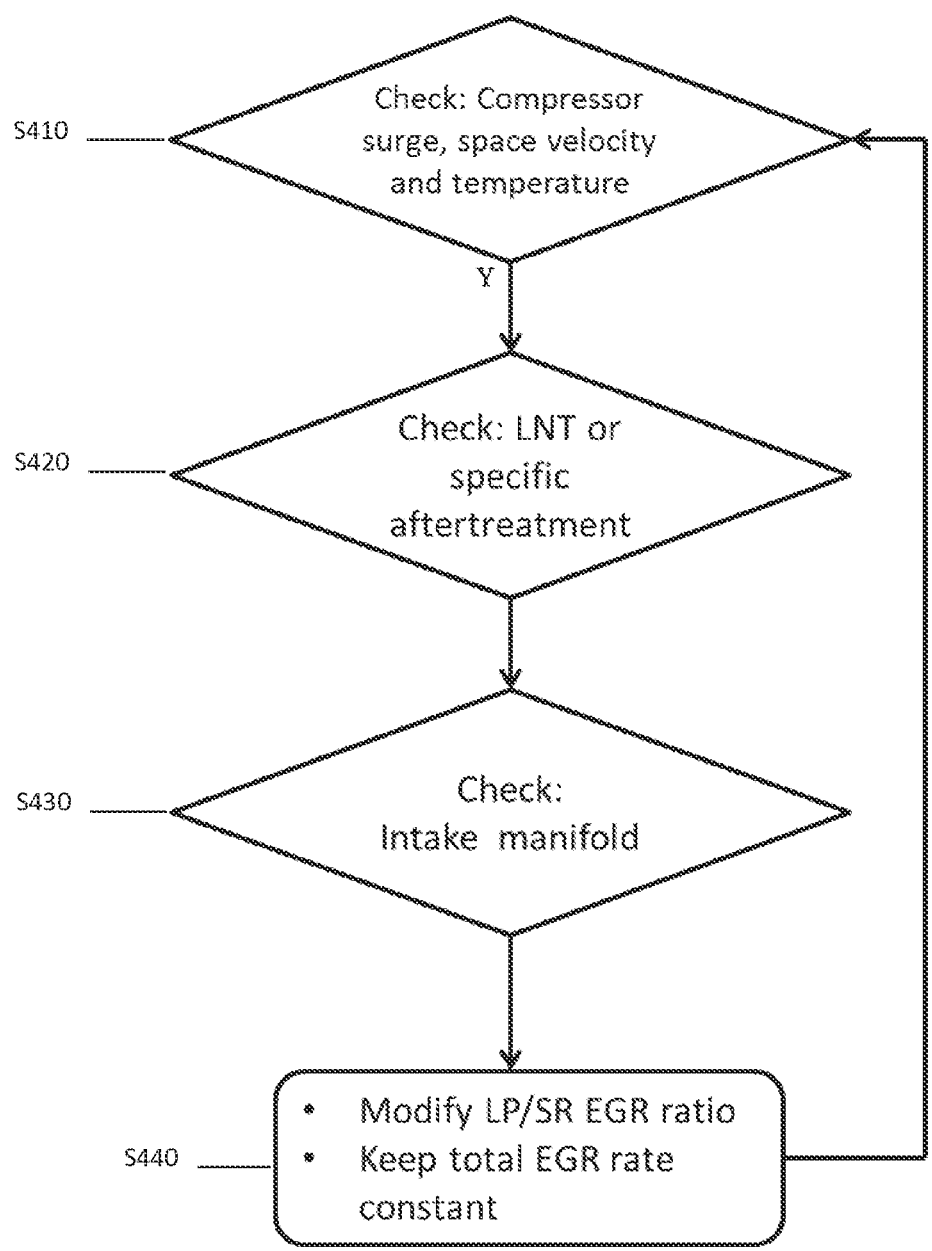
FIG. 4 is a flow chart of the method according to an embodiment of the present disclosure.

With reference to FIG. 4, the main criteria to be checked are the following: First, the compressor surge conditions and the compressor outlet temperature are checked S410 and in detail the compressor pressure ratio Beta_cmp, the compressor inlet humidity RH_comp_in and the compressor outlet temperature T_comp_out. Next, the after-treatment parameters are checked S420. For example if the after-treatment system is a lean NOx trap, the exhaust gas temperature T_LNT at the LNT inlet and the mass flow or the space velocity SV_LNT in the LNT are verified. It has to be noted that the space velocity (dimensionally [s$^{-1}$]) inside LNT is calculated as the ratio between the exhaust mass flow upstream LNT, the density and the LNT volume. The density is calculated as the ratio between the LNT pressure (average of pressure between LNT upstream pressure and LNT downstream pressure) and the product between LNT main temperature (average temperature between LNT upstream temperature and LNT downstream temperature) and the ideal gas constant. Then, an intake manifold parameter, namely the intake manifold temperature T_int_man, is checked as well S430. Finally a check of the low pressure EGR ratio (LP-EGR ratio) is performed S440 and if the actual value is in the range, which is allowed for emission stability purposes (for example, via a calibratable look-up table), then is possible to modify the low pressure EGR ratio, keeping constant the total EGR rate.

Figure 5:
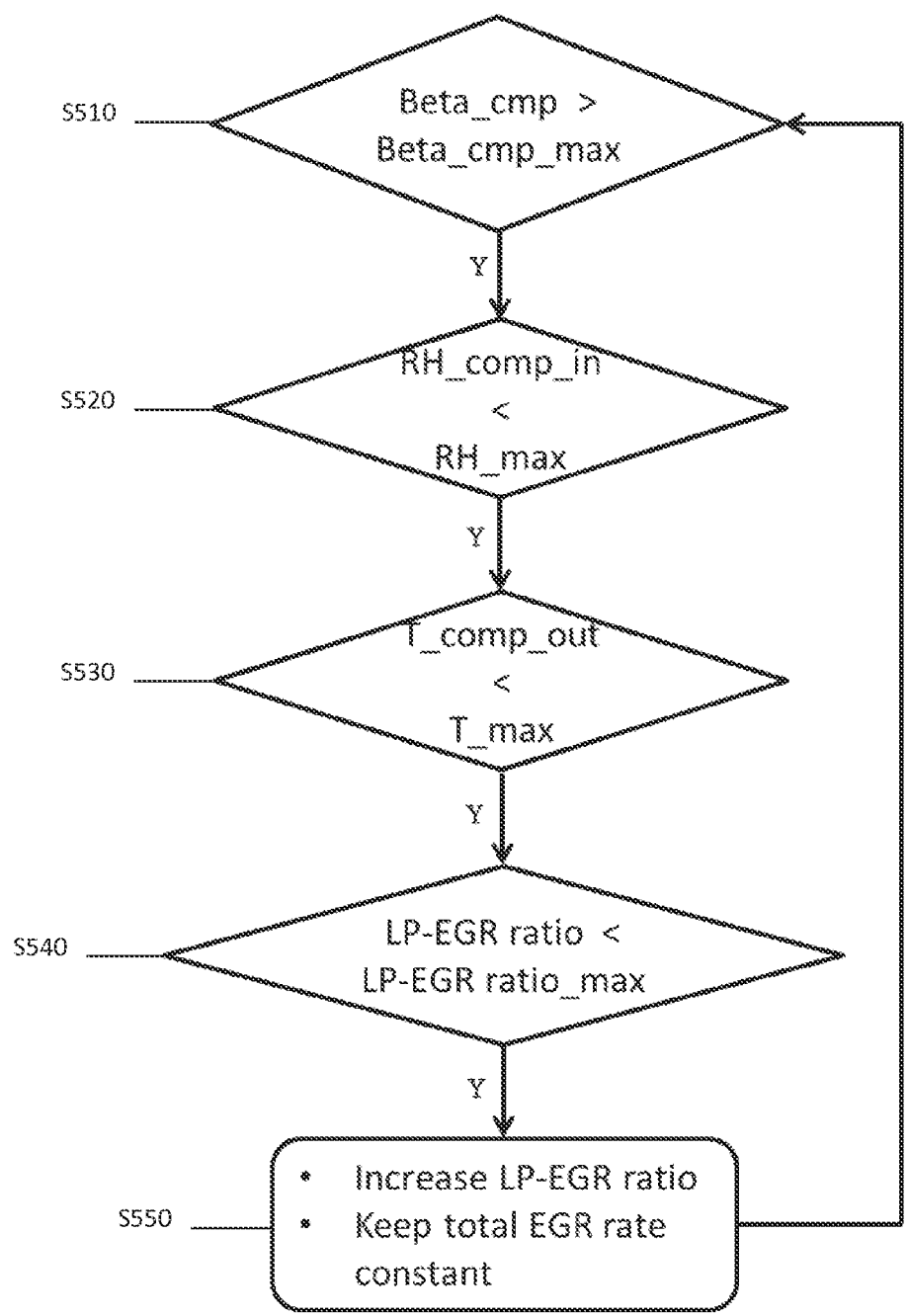
FIG. 5 is a first detailed flow chart of the flow chart in FIG. 4.

More in detail and with reference to FIG. 5, the several checks to avoid conditions for compressor surge are described. First of all, the compressor pressure ratio Beta_cmp is verified S510. If the current value of Beta_cmp is higher than the allowed maximum value Beta_cmp_max, which can be determined from a calibratable array as function of the compressor flow, further conditions must be checked to allow a change (e.g., an increase) in the low pressure EGR ratio. Therefore, the next condition, namely the compressor inlet humidity RH_comp_in is checked S520. In fact, since LP-EGR systems recirculate EGR gases before compressor, the high amount of recirculated water (present into the exhaust gases in form of vapour) could be transformed into condensed water before compressor, if the temperature at the same place is too low, causing structural issues for the compressor. Therefore, the actual value of the compressor inlet humidity RH_comp_in must be lower than the allowed maximum value RH_max, which can be determined from a calibratable array as function of the low pressure EGR rate. Then, the next condition can be verified S530, that is the check of the compressor outlet temperature T_comp_out. Also this parameter is influenced by the low pressure EGR rate, since a higher low pressure EGR rate, recirculated before the compressor, will cause an increase of the compressor outlet temperature. Therefore, the current value of the compressor outlet temperature T_comp_out must be lower than the allowed maximum value T_max, which is a calibratable value, as well. Finally a check of the low pressure EGR ratio (LP-EGR ratio) is performed S540 and if its current value is lower than the allowed maximum values LP-EGR ratio_max for emission stability purposes (such values are available from a calibratable look-up table), then the low pressure EGR ratio (LP-EGR ratio) is increased S550, by keeping constant the total EGR rate. According to this strategy, the surge risk is then decreased because of the correspondent flow increase through the compressor, due to the increased low pressure EGR rate, which as the effect to quickly shift the compressor operating point far from the surge line. Once surge risk ceases, the old low pressure EGR ratio can be restored through a ramp-down.

Figure 6:
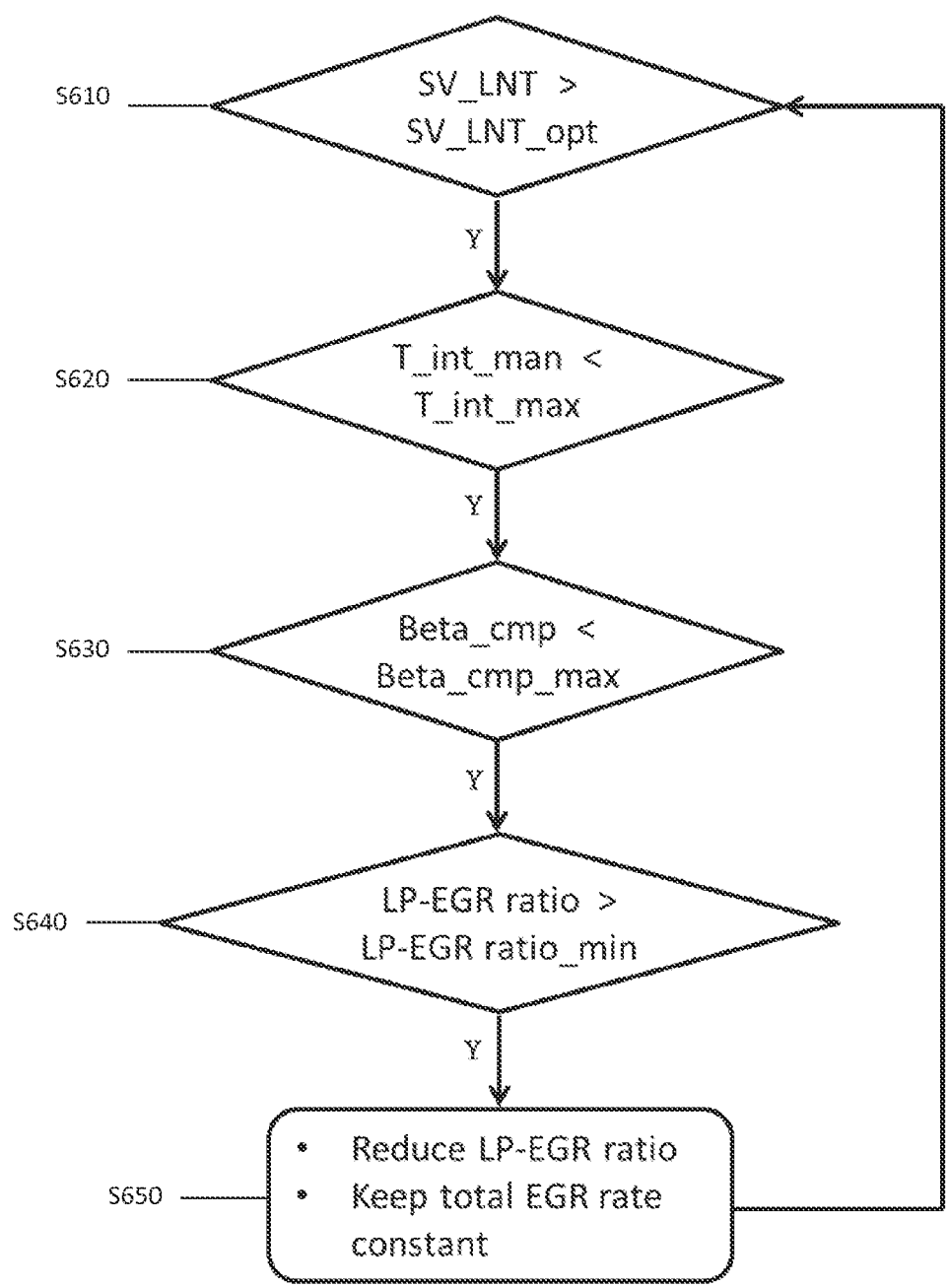
FIG. 6 is a second detailed flow chart of the flow chart in FIG. 4.

With reference to FIG. 6, the several checks about the after-treatment parameters are now described. First of all, the exhaust gas space velocity SV_LNT in the LNT (or in another after-treatment system) is verified S610 and if the current value is higher than the optimal one SV_LNT_opt, which can be determined from a calibratable array as function of the exhaust gas temperature, then further conditions should be verified, to allow a change (e.g., decrease) in the low pressure EGR ratio. In fact, the check of the intake manifold temperature T_int_man is performed S620. This control is done to avoid overheating conditions in the intake manifold, which can arise if the high pressure EGR rate is too high. Therefore the current value of the intake manifold temperature Tint man must be lower than the maximum one T_int_max, which is a calibratable value. Further, the check of the compressor pressure ratio Beta_cmp is performed S530. Also this parameter is influenced by the low pressure EGR ratio: by decreasing the low pressure EGR ratio, in fact, the total mass through the compressor is reduced and this could cause the risk to approximate the surge conditions of the compressor. Therefore, the current value of the compressor pressure ratio Beta_cmp should be lower than the allowed maximum value Beta_cmp_max. Finally the check of the low pressure EGR ratio (LP-EGR ratio) is performed S640 and if its current value is higher than the allowed minimum value LP-EGR ratio_min for emission stability purposes (such values are also available from a calibratable look-up table), then the low pressure EGR ratio is decreased S650, by keeping constant the total EGR rate. According to this strategy, the space velocity of the after-treatment system is optimized by reducing the exhaust flow rate thanks to a corresponding reduction of low-pressure EGR rate. Once the space velocity is again inside the allowable values, the old low pressure EGR ratio is restored through a ramp-up.

Figure 7:
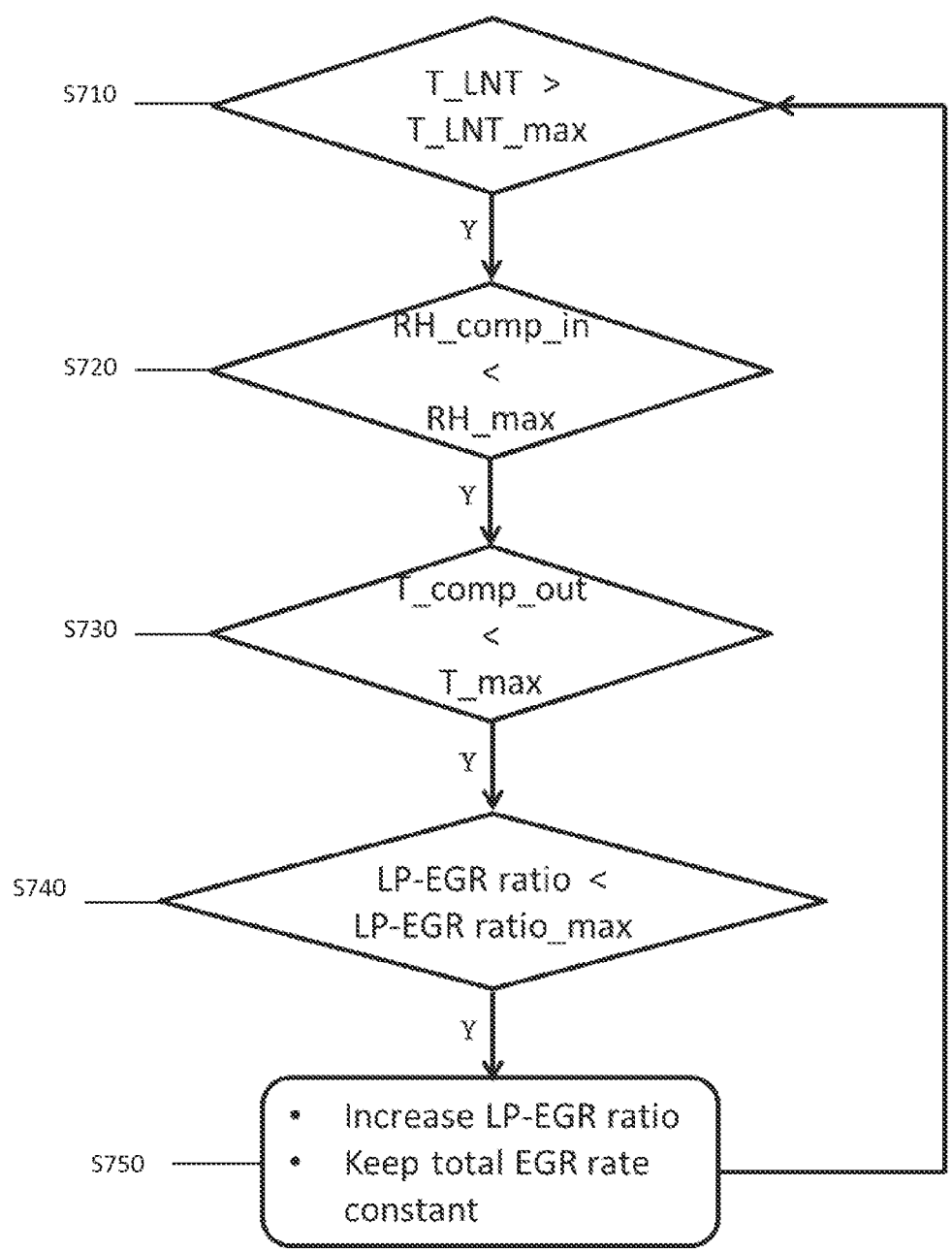
FIG. 7 is a third detailed flow chart of the flow chart in FIG. 4.

With reference to FIG. 7, further checks about the after-treatment parameters are now described. For optimal emission conditions, the exhaust gas temperature at the after-treatment system inlet (for example, at the LNT inlet) should not overcome certain values, which can worse the NOx storage. Therefore, a check of the exhaust gas temperature is carried out S710 and if the current value of the exhaust gas temperature T_LNT is higher than the allowable maximum values T_LNT_max, which can be determined from a calibratable array as function of the space velocity, then further conditions must be checked to allow a change (e.g., increase) of the low pressure EGR ratio. First of all, the compressor inlet relative humidity RH_comp_in is verified S720 and if its current value is lower than the allowed maximum value RH_max, then the next condition is verified S730, namely the compressor outlet temperature T_comp_out, which must be lower than the allowed maximum value T_max. Finally, the check of the low pressure EGR ratio (LP-EGR ratio) is performed S740 and if its current value is lower than the allowed maximum values LP-EGR ratio_max for emission stability purposes (as mentioned, such values are available from a calibratable look-up table), then the low pressure EGR ratio is increased S750, by keeping constant the total EGR rate. According to this strategy, the exhaust temperature level for NOx storage is kept under the allowable threshold even during heavy operations thanks to the reduction of the LP-EGR rate. Once such heavy operations expire, the old low pressure EGR ratio is restored through a ramp-down.

Summarizing, the proposed solution enhances the management of the rate split between low pressure EGR and high pressure EGR due to the relatively stable emissions as the split is varied within a certain range, and an additional parameter (the rate split itself) is available for optimizing other engine operating parameters. This is particularly useful for extending the LP-EGR systems potentialities in view of the new homologation cycles. The proposed methodology may include: (i) temporarily increasing the LP-EGR ratio for compressor surge protection under relatively aggressive accelerations during which the emission control is still required; (ii) temporarily reducing the LP-EGR ratio for reducing/optimizing the space velocity over the engine after-treatment systems, thus enhancing NOx trapping over the LNT, at relatively high engine power levels during which the emission control is still required; and/or (iii) temporarily increasing the LP-EGR ratio for reducing/optimizing the exhaust gas temperature over engine after-treatment systems, thus enhancing NOx trapping over the LNT, at relatively high engine power levels during which the emission control is still required.

The main advantage of the proposed solution is that it would not require hardware changes, as it is related to control strategies. Moreover, it would make the current generation of the LP-EGR systems more robust towards the new homologation cycles, or reduce the specifications for new systems under design.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of controlling an exhaust gas recirculation system for an internal combustion engine of the type having a high pressure loop coupled between an exhaust manifold and an intake manifold and a low pressure loop coupled between a point downstream from an after-treatment system and the intake manifold, the method comprising:
verifying an operating parameter for a compressor surge condition is within a predetermined operating range and
controlling an EGR valve to adjust a low pressure EGR ratio within a desired emission stability range while maintaining a constant total EGR rate based on verification of the operating parameter to recirculate exhaust gas from the low pressure loop and the high pressure loop wherein the LP-EGR ratio is computed as follows:

LP-EGR ratio=LP-EGR rate/(LP-EGR rate+HP-EGR rate);

wherein the total EGR rate is computed as follows: total EGR rate=LP-EGR rate+HP-EGR rate) and
wherein LP-EGR rate is a gas flow rate through the low pressure EGR system and HP-EGR rate is a gas flow rate through the high pressure EGR system.

2. The method according to claim 1, wherein said operating parameter comprise at least one of a compressor pressure ratio (Beta_cmp), a compressor inlet humidity (RH_comp_in), and a compressor outlet temperature (T_comp_out).

3. The method according to claim 2, further comprising verifying an after treatment system parameter comprising at least one of an exhaust gas temperature (T_LNT) and an exhaust gas space velocity (SV_LNT).

4. The method according to claim 3, further comprising verifying an intake manifold temperature (T_int_man).

5. The method according to claim 2 further comprising increasing the low pressure EGR ratio (LP-EGR ratio) when the low pressure EGR ratio (LP-EGR ratio) is lower than a maximum low pressure EGR ratio (LP-EGR ratio_max) and the compressor pressure ratio (Beta_cmp) is higher than a maximum compressor pressure ratio (Beta_cmp_max) and the compressor inlet humidity (RH_comp_in) is lower than maximum compressor inlet humidity (RH_max) and the compressor outlet temperature (T_comp_out) is lower than a maximum compressor outlet temperature (T_max).

6. The method according to claim 4 further comprising decreasing the low pressure EGR ratio (LP-EGR ratio) when the low pressure EGR ratio (LP-EGR ratio) is higher than a minimum low pressure EGR ratio (LP-EGR ratio_min) and the exhaust gas space velocity (SV_LNT_opt) is higher than an optimal exhaust gas space velocity (SV_LNT_opt) and the intake manifold temperature (T_int_man) is lower than a maximum intake manifold temperature (T_int_max) and a compressor pressure ratio (Beta_cmp) is lower than a maximum compressor pressure ratio valve (Beta_cmp_max).

7. The method according to claim 4, further comprising increasing the low pressure EGR ratio (LP-EGR ratio) when the low pressure EGR ratio (LP-EGR ratio) is lower than a maximum low pressure EGR ratio (LP-EGR ratio_max), and the exhaust gas temperature (T_LNT) is higher than a maximum exhaust gas temperature (T_LNT_max) and the compressor inlet relative humidity (RH_comp_in) is lower than a maximum compressor inlet relative humidity (RH_max) and the compressor outlet temperature (T_comp_out) is lower than a maximum compressor outlet temperature (T_max).

8. An internal combustion engine comprising a compressor, an intake manifold, an after-treatment system, a low pressure EGR system and a high pressure EGR system, wherein control of said low pressure EGR system and said high pressure EGR system is performed by using a method according to claim 1.

9. A non-transitory computer readable medium comprising a computer-code suitable for performing the method according to claim 1.

10. A computer program product on which the non-transitory computer readable medium according to claim 9 is stored.

11. A control apparatus for an internal combustion engine, comprising an electronic control unit, a data carrier associated to the electronic control unit and a non-transitory computer readable medium according to claim 9 stored in a memory system.

12. A method of controlling an exhaust gas recirculation system for an internal combustion engine of the type having a high pressure loop coupled between an exhaust manifold and an intake manifold and a low pressure loop coupled between a point downstream from an after-treatment system and the intake manifold, the method comprising:

verifying, in an electronic control unit, operating parameters for a compressor surge condition, the after-treatment device and the intake manifold are within a predetermined operating range; and controlling an EGR valve with the electronic control unit, to adjust a low pressure EGR ratio within a desired emission stability range while maintaining a constant total EGR rate based on verification of the operating parameters to recirculate exhaust gas from the low pressure loop and the high pressure loop wherein the LP-EGR ratio is computed as follows:

LP-EGR ratio=LP-EGR rate/(LP-EGR rate+HP-EGR rate);

wherein the total EGR rate is computed as follows: total EGR rate=(LP-EGR rate+HP-EGR rate) and wherein LP-EGR rate is a gas flow rate through the low pressure EGR system and HP-EGR rate is a gas flow rate through the high pressure EGR system.

13. A exhaust gas recirculation system for an internal combustion engine comprising:

an exhaust gas recirculation system including:
  a high pressure loop configured to be coupled between an exhaust manifold and an intake manifold of an internal combustion engine;
  a low pressure loop configured to be coupled between a point downstream from an after-treatment device and the intake manifold of the internal combustion engine; and
  an EGR valve operable to recirculate exhaust gas from a low pressure loop and a high pressure loop an electronic control unit and a computer program product stored in non-transitory computer readable medium having a computer-code operable with the electronic control unit to verify an operating parameter for a compressor surge condition is within a predetermined operating range; and control the EGR valve to adjust a low pressure EGR ratio within a desired emission stability range while maintaining a constant total EGR rate based on verification of the operating parameter to recirculate exhaust gas at a low pressure EGR ratio and at a total EGR rate;

wherein the LP-EGR ratio is computed as follows:

LP-EGR ratio=LP-EGR rate/(LP-EGR rate+HP-EGR rate);

wherein the total EGR rate is computed as follows: total EGR rate=(LP-EGR rate+HP-EGR rate) and wherein LP-EGR rate is a gas flow rate through the low pressure EGR system and HP-EGR rate is a gas flow rate through the high pressure EGR system.

* * * * *